(12) United States Patent
Soo Too et al.

(10) Patent No.: US 12,196,495 B2
(45) Date of Patent: Jan. 14, 2025

(54) MOVING-BED PARTICLE HEAT EXCHANGER

(71) Applicant: Commonwealth Scientific and Industrial Research Organisation, Acton (AU)

(72) Inventors: Yen Chean Soo Too, Acton (AU); Wilson Gardner, Acton (AU); Jin-Soo Kim, Acton (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 334 days.

(21) Appl. No.: 17/637,207

(22) PCT Filed: Aug. 21, 2020

(86) PCT No.: PCT/AU2020/050874
§ 371 (c)(1),
(2) Date: Feb. 22, 2022

(87) PCT Pub. No.: WO2021/030875
PCT Pub. Date: Feb. 25, 2021

(65) Prior Publication Data
US 2022/0299270 A1    Sep. 22, 2022

(30) Foreign Application Priority Data
Aug. 22, 2019 (AU) ................................. 2019903064

(51) Int. Cl.
*F28D 13/00* (2006.01)
*F28D 20/00* (2006.01)

(52) U.S. Cl.
CPC .......... *F28D 13/00* (2013.01); *F28D 20/0056* (2013.01); *F28D 2020/0069* (2013.01); *F28D 2020/0086* (2013.01)

(58) Field of Classification Search
CPC ................ F28D 13/00; F28D 20/0056; F28D 2020/0069; F28D 2020/0086
(Continued)

(56) References Cited

U.S. PATENT DOCUMENTS 1,454,053 A * 5/1923 Jones ........................ F28F 9/22
165/161
2,995,426 A * 8/1961 Keith ......................... B01J 8/28
422/142
(Continued)

FOREIGN PATENT DOCUMENTS

NL         9300666 A  * 11/1994  ............ B01J 8/0055
WO   2017/210713 A1    12/2017

OTHER PUBLICATIONS

International Search Report and Written Opinion of the International Searching Authority for International Patent Application No. PCT/AU2020/050874 mailed Sep. 28, 2020, 10 pages.
(Continued)

*Primary Examiner* — Jon T. Schermerhorn, Jr.
(74) *Attorney, Agent, or Firm* — Merchant & Gould P.C.

(57) ABSTRACT

A particle heat exchanger comprising: a housing including an inlet located at the top of the housing, and an outlet located below the inlet, the housing configured to enclose a flow of heat transfer particles which flows downwardly from the inlet to the outlet within the housing; at least one heat transfer tube enclosed in the housing and in contact with the flow of heat transfer particles therein, each heat transfer tube extending substantially parallel to an axis extending between the inlet and outlet of the housing; and at least one divider located between the inlet and outlet of the housing, the at least one heat transfer tube extending through each divider, each divider including at least one opening configured to
(Continued)

form at least one flow constriction in the flow of heat transfer particles between the inlet and outlet of the housing.

20 Claims, 13 Drawing Sheets

(58) Field of Classification Search
USPC .................................................. 165/104.16
See application file for complete search history.

(56) References Cited

U.S. PATENT DOCUMENTS

| | | | | |
|---|---|---|---|---|
| 3,663,179 A * | 5/1972 | Mehta | ..................... | B01J 8/0257 422/208 |
| 3,912,002 A | 10/1975 | Elliot | | |
| 4,307,773 A | 12/1981 | Smith | | |
| 4,313,301 A * | 2/1982 | Belke | ....................... | B01J 8/382 165/104.16 |
| 4,479,308 A * | 10/1984 | Bertelsen | ................. | F28C 3/16 34/171 |
| 4,482,358 A * | 11/1984 | Hsieh | ....................... | C10J 3/526 55/474 |
| 4,598,766 A * | 7/1986 | Michalak | ................ | F28D 13/00 261/157 |
| 4,735,780 A | 4/1988 | Noe | | |
| 4,969,937 A * | 11/1990 | Tassicker | ............ | B01D 46/2407 55/508 |
| 4,971,611 A * | 11/1990 | Noguchi | ............... | F26B 21/083 96/123 |
| 5,832,991 A | 11/1998 | Cesaroni | | |
| 6,185,841 B1 * | 2/2001 | Conochie | .................. | F26B 3/00 34/348 |
| 7,476,364 B2 * | 1/2009 | Peng | ...................... | B01D 46/66 55/474 |
| 9,464,847 B2 * | 10/2016 | Maurer | ................. | F28D 7/1669 |
| 9,513,059 B2 * | 12/2016 | Maurer | ................. | F28D 7/0058 |
| 10,488,120 B2 * | 11/2019 | Abbasi | ..................... | F28B 1/02 |
| 2013/0284163 A1 | 10/2013 | Flamant et al. | | |

OTHER PUBLICATIONS

Albrecht, K. et al., "Heat Transfer Models of Moving Packed-Bed Particle-to-SCO2 Heat Exchangers", Proceesings of the ASME 2017 Power and Energy Conference, 1-10 (Jun. 2017).

Baumann, T. et al., "Development and performance assessment of a moving bed heat exchanger for solar central receiver power plants", Energy Procedia, 69: 748-757 (2015).

Steiner, P. et al., "Active Fluidized Bed Technology Used for Thermal Energy Storage", Proceedings of the ASME 2016 10th International Conference on Energy Sustainability, 1-10 (Jun. 2016).

\* cited by examiner (A)

(B)

MOVING-BED PARTICLE HEAT EXCHANGER

CROSS REFERENCE

This application is a National Stage Application of PCT/AU2020/050874 filed 21 Aug. 2020, which claims priority from Australian Provisional Patent Application No. 2019903064 filed 22 Aug. 2019, and which applications are incorporated herein by reference. To the extent appropriate, a claim of priority is made to each of the above-disclosed applications.

TECHNICAL FIELD

The present invention generally relates to a moving-bed particle heat exchanger configured to transfer heat between a moving bed of heat transfer particles and a heat transfer medium. The present invention is particularly applicable for transferring heat from heat transfer particles heated by solar energy from a solar receiver to a heat transfer medium and will be described in relation to that exemplary application. However, it should be appreciated that the moving-bed particle heat exchanger could be used in a wide variety of other heat exchange applications which involve heat transfer between particles and another heat transfer medium which could be either heat source or sink.

BACKGROUND OF THE INVENTION

The following discussion of the background to the invention is intended to facilitate an understanding of the invention. However, it should be appreciated that the discussion is not an acknowledgement or admission that any of the material referred to was published, known or part of the common general knowledge as at the priority date of the application.

Particle heat exchangers (PHX), typically comprising a fluid (liquid/gas/multi-phase medium)/solid fluidised bed have been developed for a variety of applications including petrochemical, minerals, food processing, paper and power industries. Particle heat exchangers facilitate heat transfer between a solid particle stream, typically a fine-grained particle stream that is fluidised in some manner, and a fluid stream, typically a liquid or gaseous or multi-phase heat transfer fluid. The use of a solid particle stream as a heat transfer medium provides advantages associated the thermal and chemical stability of heat transfer particles at elevated temperatures as well as its fluid-like behaviour.

Particle-based heat transfer systems have recently been investigated as a replacement to molten salts as a heat transfer medium and thermal energy storage (TES) medium for the next generation of solar power/thermal (CSP/T) systems. A significant advantage of particle-based heat transfer systems relative to molten salts is the ability to operate over a wide range of temperatures. Particles can achieve high temperatures (>700° C. and in some cases even >1000° C.) without decomposition or corrosion and are able to operate a "low" temperatures (<0° C.) without phase change. In such systems (for example as illustrated in FIG. 1), fine particles are used to collect heat from the central receiver of a solar power/thermal system, and then transfer that collected heat to a heat transfer fluid through a particle heat exchanger. These advantages enable a heat transfer system to be designed with higher efficiency than molten salt versions, and lead towards the design of directly-heated particle receivers and offer a cost-effective TES option.

For this technology to be viable, a particle heat exchanger (PHX) must be designed that can effectively transfer heat from/to the hot fine particles to/from the heat transfer medium. A number of particle heat exchangers have been previously studied and tested for this application, including heat transfer of the particles to the heat transfer fluid in tubes or parallel plates, and heat transfer through fluidised particle flow to the heat transfer fluid in tubes. Examples of these prior PHX designs include:

A moving bed tubular PHX with a horizontal tube array which is investigated in T. Baumann, S. Zunft, Energy Procedia (2015) 748-757. The design consists of a cross-flow arrangement where hot fine particles are gravity fed from an upper feed point through a vertically arranged duct over and through a horizontally orientated tube array. The particle flow impacts the top of the tubes, and therefore creates cone-shaped stagnant zones at the top of the horizontal tubes and void zones below the horizontal tubes, significantly reducing the effective heat transfer area of the tubes. In addition, the limitation in the size of the duct requires multiple manifolds/bends to connect the horizontal tube array for large-scale systems.

A gravity fed countercurrent plate PHX which is investigated in K. Albrecht, C. Ho, Proc. ASME 11th Int. Conf. on Energy Sustainability (2017) ES2017-3377. This design consists of a plate heat exchanger configured in a counter-flow arrangement where hot particles move downwardly under gravity from a top section to a bottom section in the spacing between parallel diffusion-bonded micro-channel plates of which contain a heat transfer fluid flow therein. Due to size limitation of fabricating micro-channel plates, multiple manifolds must be used to connect the micro-channel plates. The spacing between parallel micro-channel plates is typically <3 mm in order to achieve reasonable particle-side heat transfer coefficient. This can provide a practical challenge in maintaining the narrow spacing when the micro-channel plates thermally expand at elevated temperatures.

A hot sand fluidised bed PHX which is investigated in international patent publication WO2017210713A1 (known as "SandTES"). This PHX comprises a bundle of horizontal tubes carrying a heat transfer fluid which is immersed in a bed of hot sand fluidised by hot air injected from the bottom to transfer heat from the hot sand to the heat transfer fluid in the horizontal tubes. The fluidised bed is horizontally transported through the PHX in countercurrent direction to the flow of the heat transfer fluid by controlling the air cushion above the fluidised bed to enable fresh hot sand to be added to the PHX. Fluidising the sand bed enables high particle-side heat transfer coefficient due to mixing. However, the horizontal footprint of this type of PHX needs to be large to accommodate the large horizontal flow of the fluidised bed. Accordingly, this form of PHX is typically limited to ground based installation. For solar power/thermal (CSP/T) systems this location would require an additional particle transport system between the hot particle storage bin, PHX and cold particle storage bin compared to the previous two gravity fed PHX designs.

It would therefore be desirable to provide a new or alternate particle heat exchangers (PHX) configuration which addresses one or more of the disadvantages of previous PHX designs.

SUMMARY OF THE INVENTION

The present invention relates to a staged moving-bed particle heat exchanger that includes one or more heat transfer tubes that are aligned to a generally vertically orientated axis.

The present invention provides a particle heat exchanger comprising:
- a housing including
  - an inlet located at the top of the housing, and
  - an outlet located below the inlet,
  - the housing configured to enclose a flow of heat transfer particles which flows downwardly from the inlet to the outlet within the housing;
- at least one heat transfer tube which includes a heat transfer medium, each heat transfer tube being enclosed in the housing and in contact with the flow of heat transfer particles therein, each heat transfer tube extending substantially parallel to an axis extending between the inlet and outlet of the housing; and
- at least one divider located between the inlet and outlet of the housing, the at least one heat transfer tube extending through each divider, each divider including at least one opening configured to form at least one flow constriction in the flow of heat transfer particles between the inlet and outlet of the housing.

The inventors have found that in a bounded granular flow domain with a constant cross-sectional area, a flow of heat transfer particles becomes hydrodynamically and thermally fully developed once the particles travels further away from the inlet. An increase in the flow velocity was not found to change the flow and heat transfer characteristics, and more particularly mixing characteristics of the particle flow. The lack of mixing limits the efficient heat transfer from the particles to the heat transfer surface, with heat transfer being achieved from those particles in close proximity to the heat transfer surfaces. Particles further away from the heat transfer surface transfer heat to the heat transfer tube (and any heat transfer medium therein) through the bulk of particles that lie between that particle and the heat transfer surface.

Through modelling, the inventors have surprisingly found that mixing in a solid particle flow can be created by including at least one flow constriction in that solid particle flow. The flow constriction causes particles in the particle flow that are radially spread away from a heat transfer surface to flow towards and through the constriction, and therefore remixes the particles in that flow as the particles flow to and through the constriction. The flow constriction also creates turbulence in the flow without creating voids in the heat transfer boundary between wall and the heat transfer particles. Heat transfer can be optimised by introducing further spaced apart flow constrictions along the flow path of the solid particle flow, creating particle flow "stages". The dividers create these particle flow stages through the flow constrictions therein. The particulate flow is therefore forced to remix at every flow stage. This also causes renewal of thermal entrance region at the start of each stage. The dividers also act as flow distributors (flow distribution plates) which splits the heat transfer particle flow into a series of short particle beds.

The axial (generally vertical) orientation of the heat transfer tubes in the housing between the top inlet and lower outlet thereof also ensures that the particle flow is able to fully surround each heat transfer tube within the housing. Unlike horizontally orientated tubes, there are no stagnant zones or void zones around the tubes as the heat transfer particles flow evenly down and around the length of each heat transfer tube.

The particle heat exchanger of the present invention therefore simultaneously addresses three important issues of past PHX designs:
- Full utilisation of the heat transfer tube surface for heat transfer (as compared to using a horizontal tube array).
- Enhanced particle-side heat transfer through the implementing continuous renewal of thermal entrance region and/or re-mixing of particles in each stage.
- Simpler and scalable particle heat exchanger with a heat exchanger tube array (vertically orientated) for large-scale solar power/thermal system (CSP/T) application reducing the need of manifolds or bending.

It should be appreciated that in preferred embodiments that the heat transfer particles are heated by solar energy from a solar receiver. However, the invention is not limited to this application, and the heat transfer particles can be heated by alternative heating sources such as electric heating.

The housing of the particle heat exchanger is generally designed as an enclosure for the heat transfer tubes and the flow of heat transfer particles that flow around and down those tubes. In many embodiments, the housing is configured to direct the flow of heat transfer particles perpendicularly downwardly from inlet towards the outlet. In these embodiments, the heat transfer particles are contained within a cavity or internal space defined/confined between the walls of the housing, with the housing designed to direct the flow of heat transfer particles downwardly from the inlet to the lower outlet, and between the stages defined by each of the dividers. It should be appreciated that the housing can have any desired shape and configuration. In some embodiments, the housing has a polygon shaped cross-section, preferably a regular polygon such as a rectangle or a square. In other embodiments, the housing is cylindrical.

The heat transfer tubes are typically vertically orientated within the housing. In this sense, the axis between the inlet and outlet preferably defines a vertical axis. This typically requires the heat transfer tubes and the axis to be aligned in a vertical orientation relative to a ground surface on which the particle heat exchanger is located. Upper and lower are also to be understood in relation to the axis, with up or upwards being axially above or upwardly of a given feature and below or down being axially below or downwardly of that feature relative to the axis extending between the inlet and outlet of the housing.

The flow of the heat transfer particles is generally from the inlet towards the outlet of the housing. The outlet is below the inlet of the housing, and that flow of heat transfer particles is therefore in a generally downwardly direction relative to the inlet of the housing. In many embodiments, this flow direction allows that heat transfer particle flow to be gravity driven.

The flow constriction openings in the each divider are sized to remix the particles as the particles flow to and through the constriction. The particular size and configuration of that opening is generally designed to suit a particular solid particle feed (with different size and properties), heat exchange application and heat exchanger configuration. In general terms, the at least one opening of the divider is configured to constrict the flow by at least 20% of the cross-sectional flow area within the housing, preferably between 20 to 80% of the cross-sectional flow area within the housing. This flow constriction can be at least 60%, preferably at least 70% of the cross-sectional flow area within the housing in some embodiments.

The flow constriction opening can have various configurations. In many embodiments, the flow constriction opening comprises an aperture located proximate to, preferably surrounding the intersection between each of the heat transfer tubes and each divider. This opening can comprise an annular opening, preferably an annulus shaped opening, surrounding the intersection between each of the heat transfer tubes and each divider. The size of the opening provides an annular gap through which the heat transfer particles flow. The size of that annular gap can be tailored to provide a particular flow volume through each stage and also the overall particle heat exchanger. The size of that annular gap can also be changed to modify the characteristics of the renewal of thermal entrance region at the start of each stage. Each opening can also include at least one arm extending from the divider to the heat transfer tube configured to locate the heat transfer tube within each opening. These arms form tube support elements in the divider use to locate and hold the heat transfer tube in position within the housing. The arms can be configured to accommodate thermal expansion of the heat transfer tube. The arms can comprise any flange, rib or other protuberance that extends radially from the divider to locate, preferably engage with the outer surface of the heat transfer tubes located in the flow constriction opening. It should however be appreciated, that in alternate embodiments each heat transfer tube may include one or more arms, flanges or ribs that extend into the flow constriction opening to perform the same function as arms which extend from the divider.

The heat transfer tubes can include any suitable heat transfer medium or arrangement which can transfer heat from the heat transfer particle. In some embodiments, the heat transfer medium comprises a fluid, preferably a heat transfer fluid. In some embodiments, the heat transfer medium comprises heat transfer particles or a multi-phase arrangement. In some embodiments, the heat transfer medium could include an endothermal chemical process or the like. In some embodiments, the heat transfer medium comprises a solid medium with or without involving flow of the heat transfer medium, for example a heating element, or a reaction involving solid catalyst and reactant/product gas.

In exemplary embodiments, the heat transfer medium comprises a heat transfer fluid that flows through the at least one heat transfer tube. Each heat transfer tube is enclosed in the housing and extends substantially parallel to an axis extending between the inlet and outlet of the housing. In these embodiments, the present invention provides a particle heat exchanger comprising:

a housing including
an inlet located at the top of the housing, and
an outlet located below the inlet,
the housing configured to enclose a flow of heat transfer particles which flows downwardly from the inlet to the outlet within the housing;
at least one heat transfer tube through which a heat transfer fluid can flow, each heat transfer tube being enclosed in the housing and in contact with the flow of heat transfer particles therein, each heat transfer tube extending substantially parallel to an axis extending between the inlet and outlet of the housing; and
at least one divider located between the inlet and outlet of the housing, the at least one heat transfer tube extending through each divider, each divider including at least one opening configured to form at least one flow constriction in the flow of heat transfer particles between the inlet and outlet of the housing.

The flow of heat transfer fluid within the heat transfer tubes can be in any suitable direction relative to the flow of heat transfer particles. In some embodiments, that flow is in a co-current direction relative to the flow of heat transfer particles. In other embodiments, the flow of heat transfer fluid flows in a counter-current direction to the flow of heat transfer particles. A mixture of co-current and counter-current flow is also possible where multiple heat transfer tubes are included in the particle heat exchanger.

The particle heat exchanger of the present invention can include one heat transfer tube. However, embodiment of the heat exchanger of the present invention preferably includes at least two heat transfer tubes and preferably multiple heat transfer tubes laterally spaced apart within the housing. The use of multiple heat transfer tubes and/or multiple modular housings connected in parallel which include multiple heat transfer tubes increases the heat exchange capacity of the apparatus. Here the heat transfer tubes are preferably arranged in a vertical tube array within the or each housing.

Each heat transfer tube comprises a substantially linear cylindrical tube in many embodiments. Each heat transfer tube is constructed of a thermally conductive material. The particular material of construction is generally selected to suit the operating temperature range of the heat exchanger and the required chemical compatibility of the heat transfer particles and heat transfer fluid. Examples of suitable materials include metals, ceramics, carbides, such as stainless steel, nickel-based alloy, alumina, silicon carbide and graphite. Particular examples include stainless steels (316, Sandvik 253MA), nickel-based alloys (Haynes 230, Haynes 207, Inconel 617, Inconel 625, Inconel 800H, Inconel 740H). It should however be understood that other materials of construction could be used depending on the specific application and that the present invention is not limited to the materials recited above.

The particle heat exchanger of the present invention can be configured to include any number of particle bed stages. The particle heat exchanger may therefore include only one, but more preferably two or more dividers spaced apart between the inlet and outlet of the housing along the length of each heat transfer tube. Any number of dividers could be used for example three, four, six, ten or the like between the inlet and outlet of the housing depending on the available dimensions for the heat exchanger and the particular heat transfer application. Each divider preferably comprises a planar element which is radially orientated to the axis extending between the inlet and outlet so as to divide the housing into at least two separated solid particle flow chambers. That planar element typically comprises a sheet or plate.

The housing of the particle heat exchanger can have various forms. In some embodiments, the housing comprises a container having an interior space which encloses all of the heat transfer tubes within the interior space therein. In these embodiments, the housing encloses multiple heat transfer tubes. Here the flow of the heat transfer particles is within a common space (flow volume). In other embodiments, the housing comprises a plurality of spaced apart solid flow conduits, each having an inlet and outlet and each containing a heat transfer tube that extends therein. In these embodiments, the housing comprises a plurality of separate enclosures each enclosing a subset of the total number of heat transfer tubes. In some embodiments, each spaced apart solid flow conduits, contains a single heat transfer tube. Here, the housing may comprise a plurality of spaced apart containers, each enclosing a heat transfer tube therein. Each spaced apart container preferably comprises elongate tubes which extend co-axially around each heat transfer tube.

In other embodiments, the housing includes a mounting body having a plurality of spaced apart shafts, a heat transfer tube extends through each spaced apart shaft, each shaft having a larger diameter than the outer diameter of the heat transfer tube that extends therethrough. The mounting body preferably comprises a block. The housing typically includes at least two stacked mounting bodies, each divider being located between adjacent stacked mounting bodies. In this way, the divider can be inserted between mounting bodies, and function as previously described.

Mixing of the particle flow, particularly at or near the flow constrictions can be enhanced by including at least one fluidising gas arrangement located at or proximate the constriction by preferably utilising the divider for the channel to supply the gas. The fluidising gas arrangement is preferably configured to create a localised fluidising particle bubble proximate the constriction. This enhances local mixing at and proximate to each constriction.

Mixing of the particle flow can also be enhanced in embodiments by including at least one helical insert extending around at least one heat transfer tube. Similarly, the inclusion of at least one radial element, for example a rib, ledge, fin or the like, extending radially from the surface of at least one heat transfer tube into the housing could enhance mixing of the heat transfer particle flow. In some embodiments, the fin comprises a longitudinal fin which extends along at least part of the length of a heat transfer tube. In some embodiments, the radial element, for example a rib or fin, which extends circumferentially around the heat transfer tube. The radial element is preferably longitudinally spaced apart from a divider, in a position before the divider along the length of the heat transfer tube relative to the direction of flow of the heat transfer particles. Adding a radial element that extends from the heat transfer tube before the flow constriction formed from the divider can enhance the mixing of particles which could create a full renewal of the thermal entrance zone at the subsequent stage below.

The fin can be attached to the heat transfer tube or tubes by any suitable means. For example, where the heat transfer tube is metal, each fin can be welded to the heat transfer tube. The fins can be used to as an additional means to increase the particle travel residence time and also create both axial and rotational particle flow pattern to enhance mixing and also increase heat transfer area.

A variety of different heat transfer particles can be used in the heat exchanger of the present invention. In general, the heat transfer particles typically comprise solid particles, in some cases solid particulates. The heat transfer particles can comprise any suitable thermally absorbent fine particle material, and thus encompass a vast variety of particles/particulates. In some embodiments, the heat transfer particles comprise a ceramic, preferably an alumina-based ceramic. In embodiments, the heat transfer particles comprise a ceramic proppant comprising 75% $Al_2O_3$, 11% $SiO_2$, 9% $Fe_2O_3$, and 3% TiO. However, a number of other materials could be used. For example, the heat transfer particles could comprise various sands, including silicon dioxide based granular particulates and/or calcium carbonate granular particulates. However, it should be appreciated that granular or particulate solid material could be used.

The size of the heat transfer particles depends on the particular application. However, in many cases the heat transfer particles will have a mean particle size of between 100 and 800 μm, and in some cases between 200 and 500 μm. In particular embodiments, the heat transfer particles will have a mean particle size of preferably around 300 μm.

It should be appreciated that the heat transfer fluid could comprise any heat transfer liquid or gas which is suitable for the particular heat transfer application and conditions. In this respect, the heat transfer fluid is selected to suit the particular heat transfer temperature range, pressure and application. For example, for solar energy utilisation (solar power/thermal systems), the supercritical carbon dioxide could be used as the heat transfer fluid. In thermal power or process waste heat applications, steam, nitrogen, carbon dioxide, air or other process gases could be used as the heat transfer fluid. In yet other applications, the heat transfer fluid could comprise a molten salt. It should be appreciated that the heat transfer fluid side can also be used for flowing another particles, any phase change (such as boiling), chemical reaction including solid catalyst and gas or heating element which require heat to be delivered from/to the heat transfer particles.

The particle heat exchanger of the present invention is particularly useful as a heat exchanger in a solar power/thermal system, preferably a heat exchanger in thermal communication with the solar receiver of a solar power/thermal system. However, it should be appreciated that may other application are possible. For example, the particle heat exchanger of the present invention could be used in the following non-limiting applications:

Solar energy utilisation at elevated temperatures above 700° C. involving the use of fine-grained particles as the heat transfer fluid and thermal energy storage medium. In the proposed PHX designs, heat can be effectively transferred from the hot particles to the heat transfer fluid in the power block or process loop to meet the demand.

The invention can be applied to a variety of applications which require particles as a thermal storage medium. Owing to the chemical and thermal stability of particles, the invention can be utilised from low temperature processes (such as steam generation system) to a very high temperature processes (such as chemical reaction systems).

Any thermal process regardless of the state or type of heat transfer fluids can take the full benefit of the present invention based on the consideration that the present invention is offering enhanced heat transfer in the particle side, and the particle side heat transfer is mainly controlling the entire heat transfer rate of the particle heat exchanger.

BRIEF DESCRIPTION OF THE DRAWINGS

The present invention will now be described with reference to the Figures of the accompanying drawings, which illustrate particular preferred embodiments of the present invention, wherein.

DETAILED DESCRIPTION

The present invention provides an alternate particle heat exchanger arrangement configured to transfer heat from a solid particle flow to a heat transfer medium flowing through a heat transfer tube. The particle heat exchanger has been designed for use in a solar power/thermal system for transferring heat from heat transfer particles heated by solar energy from a solar receiver to a heat transfer medium such as a heat transfer fluid. However, it should be appreciated that the particle heat exchanger of the present invention could be used in a variety of other heat transfer application where solid particle heat transfer is required.

Figure 1:
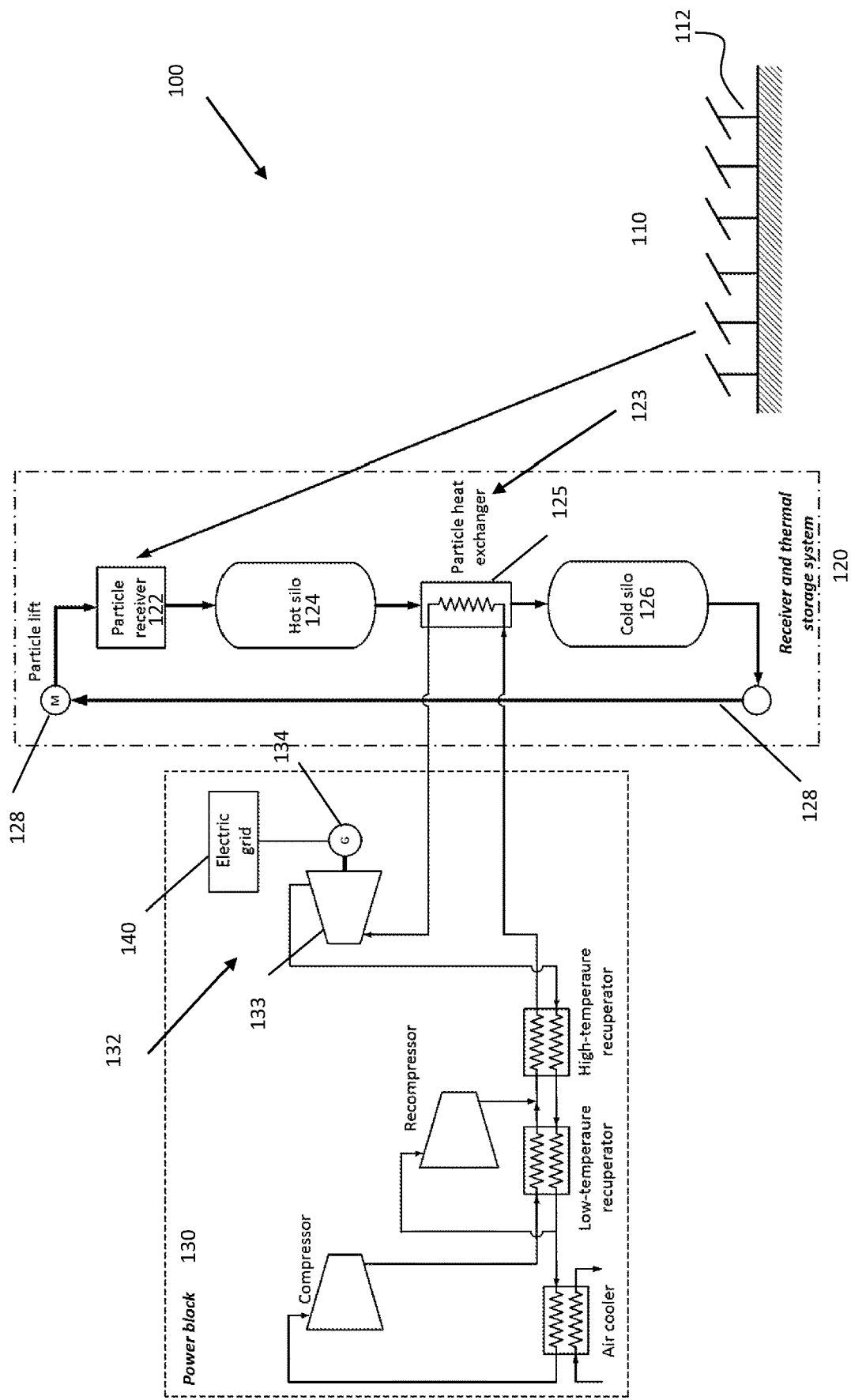
FIG. 1 illustrates a schematic diagram of a solar power/thermal system showing the location of a particle heat exchanger according to embodiments of the present invention when located in thermal communication with a solar receiver of that system.

FIG. 1 shows a schematic diagram of a solar power/thermal system 100 showing the location of a particle heat exchanger 200 according to embodiments of the present invention when located in thermal communication with a solar receiver and thermal storage system 120 of that system. A shown in FIG. 1, the solar power/thermal system 100 comprises four integrated areas:

1. A solar field 110 which consists of a set array of heliostats 112, which are effectively shaped reflective surfaces which reflect and concentrate solar energy towards a solar receiver 122 (see below). Each heliostat 112 is individually controlled to track the movement of the sun during the day and direct (reflect) solar energy to the solar receiver 122.
2. A receiver and thermal storage system 120 which comprises the solar receiver system 122 which functions to receive the directed solar energy from the heliostats 112 and transfer that energy to a heat transfer medium, in this case heat transfer particles. The heated heat transfer particles are gravity fed into a hot particle storage bin (hot silo) 124, ready to be gravity fed into the heat exchanger 125 located below the hot silo 124. Heat exchanger 125 is configured for transferring heat from the heated heat transfer particles to a heat transfer medium. For the present invention, this heat exchanger is configured according to embodiments of the particle heat exchanger 200 of the present invention. The details of the particle heat exchanger 200 of the present invention will be explained in more detail below. Cold heat transfer particles (heat transfer particles having a lower thermal content—i.e. temperature—than the fed heated heat transfer particles, exit the heat exchanger 125 and gravity feed into a cold particle storage bin (cold particle silo) 126, where these particles are stock piled until they are recycled back to the solar receiver 122 to be heated, in the illustrated system using a particle elevator 128. It is worth noting that in the illustrated embodiments the hot silo 124, heat exchanger 125 and cold silo 126 are vertically connected in series, and the heat transfer particles progressively move through these units by gravity. However, it should be appreciated that the storage (the hot silo 124 and cold silo 126) and heat exchanger 125 configuration will depend on the storage size. For example, in other embodiments several heat exchangers 125 can be arranged in parallel, and connected to the silos, especially the storage volume is sufficiently large.
3. A power block 130 comprising a thermal power conversion system 132, which in the illustrated system comprises a power turbine 133 which drives an electrical generator 134, but could comprise any suitable electrical generation system. The power turbine 133 utilises the heated heat transfer medium to drive movement of the turbine.
4. Electric grid connection 140, which is the connection to the external electricity grid at that geographic location to transmit the generated power from the generator 134 into the external electricity grid.

The various parts of the solar power/thermal system 100 can have various configurations depending in the application, power requirements and technology used at the solar power/thermal system 100. For example, the solar receiver 122 can have a number of different configurations to heat the heat transfer particles therein. The present invention concerns the heat exchanger 125 component of the receiver and thermal storage system 120, embodiments of which are illustrated and described in relation to FIGS. 2 to 4.

Figure 2:
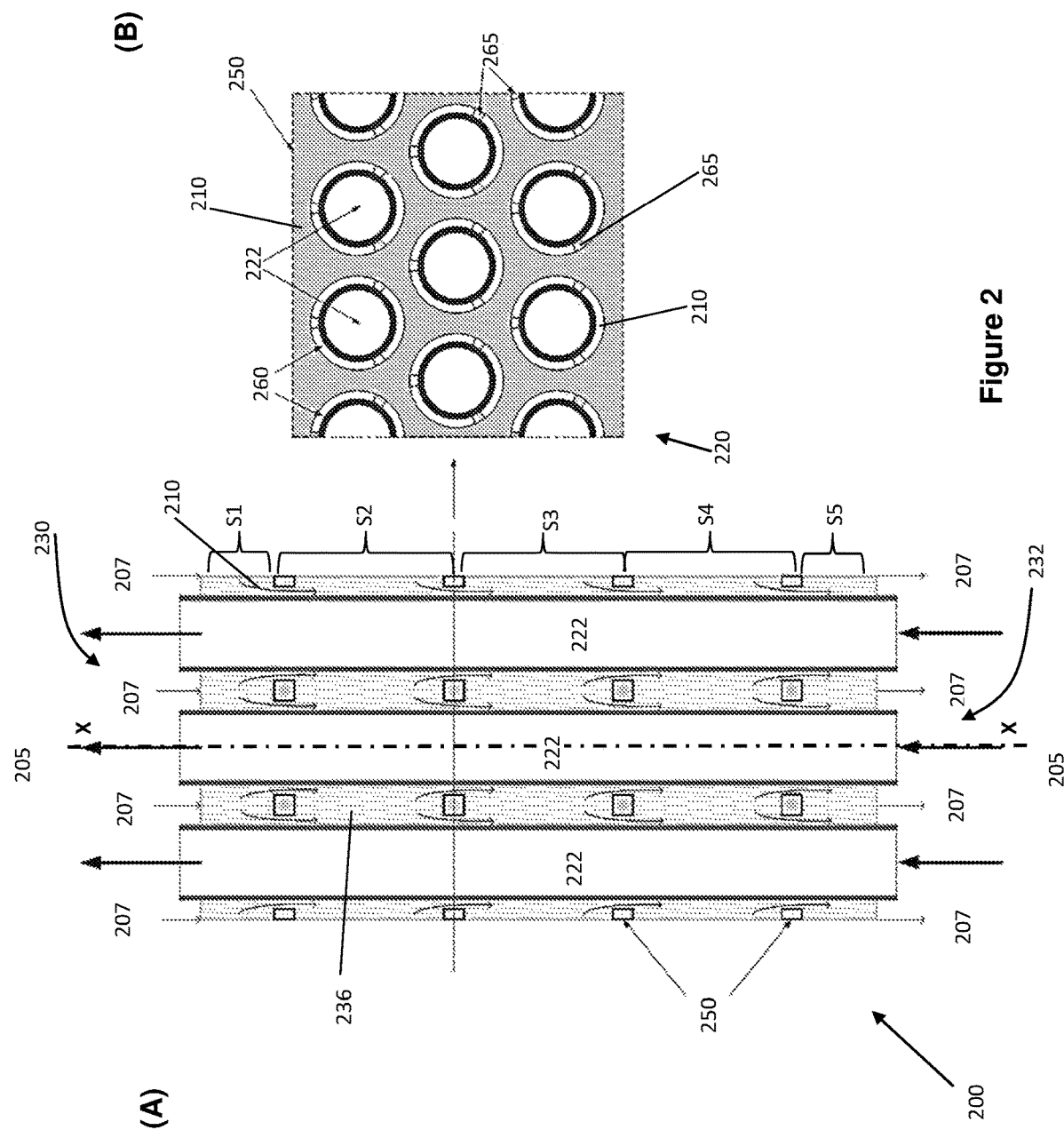
FIG. 2 illustrates a schematic diagram of a multi-stage tubular particle heat exchanger with a vertical tube array configuration and multiple flow distribution plates showing (A) A cross-sectional front view; and (B) top view of a flow distributor plate.

FIG. 2 illustrates a first embodiment of a particle heat exchanger 200 according to the present invention. FIG. 2 provides a front cross-sectional view (FIG. 2(A)) and a top cross-sectional view (FIG. 2(B)) of the particle heat exchanger 200. As illustrated, the particle heat exchanger 200 comprises a flow space 210 which encloses a vertical tube array 220 formed a multiple spaced apart heat transfer tubes (or pipes) 222. The heat transfer tubes 222 comprise elongate tubes having a required wall thickness, constructed from a heat conductive material, preferably a metal such as stainless steel and nickel-based alloy. The heat transfer tubes 222 extend vertically parallel to axis X-X shown in FIG. 2. The heat transfer tubes 222 include an internal cavity through which a heat transfer fluid 205 flows. The heat transfer fluid 205 (also known as working fluid) moved upwardly through heat transfer tubes 222 in the illustrated embodiment, which, whilst not illustrated, are connected to a header and footer. Surrounding the array of heat transfer tubes 222 is particle flow space 210 containing heat transfer particles. Whilst not shown, the particle flow space 210 is bounded by a housing which comprises a container having an interior space which encloses all of the heat transfer tubes 222 within the interior space therein. The heat transfer particles flow from an upper inlet 230 to a lower outlet 232. The heat transfer fluid 205 in heat transfer tubes 222 flows in counter-current direction to the flow of heat transfer particles 207. Again, whilst not illustrated, it should be appreciated that the actual heat exchanger 200 is contained within a sealed housing with the inlet and outlets of the heat transfer particles 207 and heat transfer fluid 205 sections connected to appropriately designed fluid and particle feed and outlet headers which would direct the flows in the required directions.

The particle heat exchanger 200 therefore comprises a counter-flow arrangement of two heat transfer fluids, i.e. a heat transfer fluid 205 inside the heat transfer tubes 222 and a moving bed 236 of heat transfer particles 207 falling under gravity around and along the outer surface of the tubes 222.

The heat transfer particles 207 comprise any suitable particles having suitable specific heat capacity for the required heating (in the receiver) and heat transfer application. The heat transfer particles 207 are typically solid particles or solid particulates having a mean particle size of between 100 and 800 μm. In exemplary embodiments the solid particulates have a mean particle size of around 300 μm. The inventors have selected ceramic heat transfer particles 207 such as alumina based ceramic particles for testing purposes, comprising a ceramic proppant comprising 75% $Al_2O_3$, 11% $SiO_2$, 9% $Fe_2O_3$, and 3% TiO. However, it should again be appreciated a vast variety of particles/particulates could equally be used for example sands such as silicon dioxide based granular particulates and/or calcium carbonate granular particulates. The invention is not intended to be limited to specific heat transfer particles.

As previously discussed, the heat transfer fluid 205 could comprise any heat transfer liquid, gas, solid or their mixture which is suitable for the particular heat transfer application and conditions. In thermal power or process waste heat applications, steam, nitrogen, carbon dioxide, air or other process gases could be used as the heat transfer fluid. In yet other applications, the heat transfer fluid 205 could comprise a molten salt.

The use of vertically aligned tubes (i.e. tubes aligned with vertical axis X-X in FIG. 2) enables the tube and the housing length to be varied without requiring bends in the tube, thus reducing the need for manifolds/bends and avoids the stagnant zones and void zones which occur when using horizontal tubes (as previously discussed). This maximises the use of each heat transfer tube's entire outer surface for heat transfer. The number of tubes can also be optimised by using longer tubes combined with a higher mass flux design, which will enable the design of larger scale systems to be more practical and viable.

Whilst not wishing to be limited to any one theory, the inventors have found that when each heat transfer tube 222 is sufficiently long, typically greater than 1 m, the particle-side heat transfer coefficient from the heat transfer particle flow to the heat transfer fluid through the wall of the heat transfer tube will approach a constant value even when the velocity of the heat transfer particle flow is increased. The inventors consider that this is due to the rapid decrease in the length of the thermal entrance region such that the heat transfer particle flow becomes fully developed thermally.

Without mixing, the particle-side heat transfer coefficient can only be improved by narrowing the radial width of the heat transfer particle flow relative to the wall (heat transfer surface) of the heat transfer tube 222, thus ensuring effective heat transfer from all particles from that flow. This solution has practical challenges as thermal expansion of the tube 222 may create flow channelling/blocking in such a narrow particle flow.

The heat transfer particle flow is split into multiple stages to prevent the full thermal development of that flow. As shown in FIG. 2, multiple flow distribution plates 250 (acting as a divider element) are included at spaced apart positions along the length of the vertical tube array 210. Each flow distribution plate 250 is designed to split the heat exchanger 200 into a series of short particle beds (S1, S2, S3, S4 and S5 in FIG. 2) to redistribute the gravity-driven moving particles. Each flow distribution plate 250 includes a series of flow constriction openings 260 comprising annular gaps in the plate 250 at the intersection of the flow distribution plate 250 and each heat transfer tube 222. These flow constriction openings 260 comprise annulus shaped gaps, annularly extending around each heat transfer tube 222. The gap forms a flow constriction in that particle flow, causing the particles to move towards and through the construction. This creates new thermal entrance region at each construction and forces re-mixing of particles at the end of each stage before entering to the next stage, thus enhancing the particle-side heat transfer coefficient. Each flow constriction openings 260 includes a tube support fingers/arms 265 (FIG. 2A) which extend from the distribution plate 250 across the opening 260 to engage the surface of each heat transfer tube 222 to hold the tube array in place within the heat exchanger 200 is a position aligned with axis X-X (i.e. vertically). The fingers 265 comprise tabs that which extend from the distribution plate 250 to engage the heat transfer tube 222. However, it should be appreciated that rods, flanges, ribs or similar protuberances that extend from the distribution plate 250 or from the heat transfer tube 222 could equally be used. The fingers 265 are also configured to allow axial thermal expansion of the heat transfer tubes 222 when heated and also maintain consistent particle flow channels between the heat transfer tubes 222.

The present invention therefore provides an alternate solution to narrowing the width of the particle flow by providing mixing of the heat transfer particle flow at various points along the flow path. The present invention resolves such inherent heat transfer barrier limitations associated with long and fast moving bed particles to provide a design pathway towards a more cost-effective commercial scale PHX.

Figure 3:
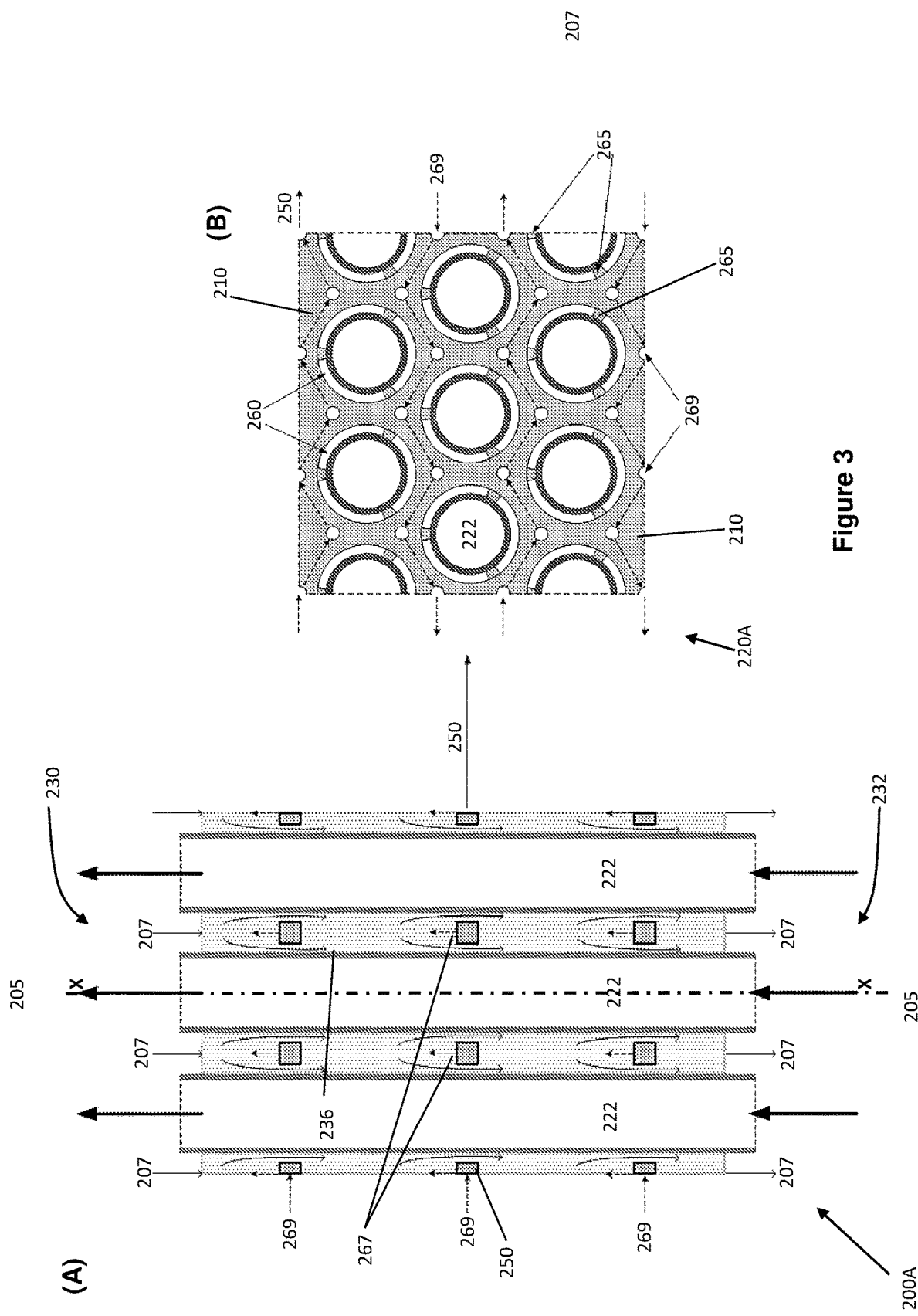
FIG. 3 illustrates a schematic diagram of a fluidised multi-stage tubular particle heat exchanger with a vertical tube array configuration and multiple flow distribution plates showing (A) A cross-sectional front view; and (B) top view of a flow distributor plate.

A second embodiment of a particle heat exchanger 200A according to the present invention is illustrated in FIG. 3. FIG. 3 provides a front cross-sectional view (FIG. 3(A)) and a top cross-sectional view (FIG. 3(B)) of the particle heat exchanger 200A. The heat exchanger 200A has largely the same configuration as described for heat exchanger 200 illustrated in FIG. 2. Like features have there been provided with the same reference numerals as used in relation to heat exchanger 200 illustrated in FIG. 2. In this embodiment, the flow distribution plates 250 include fluidising gas arrangements 267 configured to create local particle fluidisation zones in the region of the flow constrictions. The flow distribution plates 250 (the divider) therefore serve as the channel to supply fluidisation gas. The local particle fluidisation zones further enhance the particle-side heat transfer coefficient. The fluidising gas arrangements 267 typically comprise gas injection points, such as nozzles located on the top of the flow distribution plates 250, having a fluid connection to a fluidisation gas inlet 269 at one side of each flow distribution plates 250. This use of fluidising gas arrangements 267 creates bubbling fluidisation in the particle bed at the bottom of selected or all stages in the particle heat exchanger 200A. Bubbling fluidisation allowing particles to mix before entering the next stage to enhance particle-side heat transfer.

Figure 4:
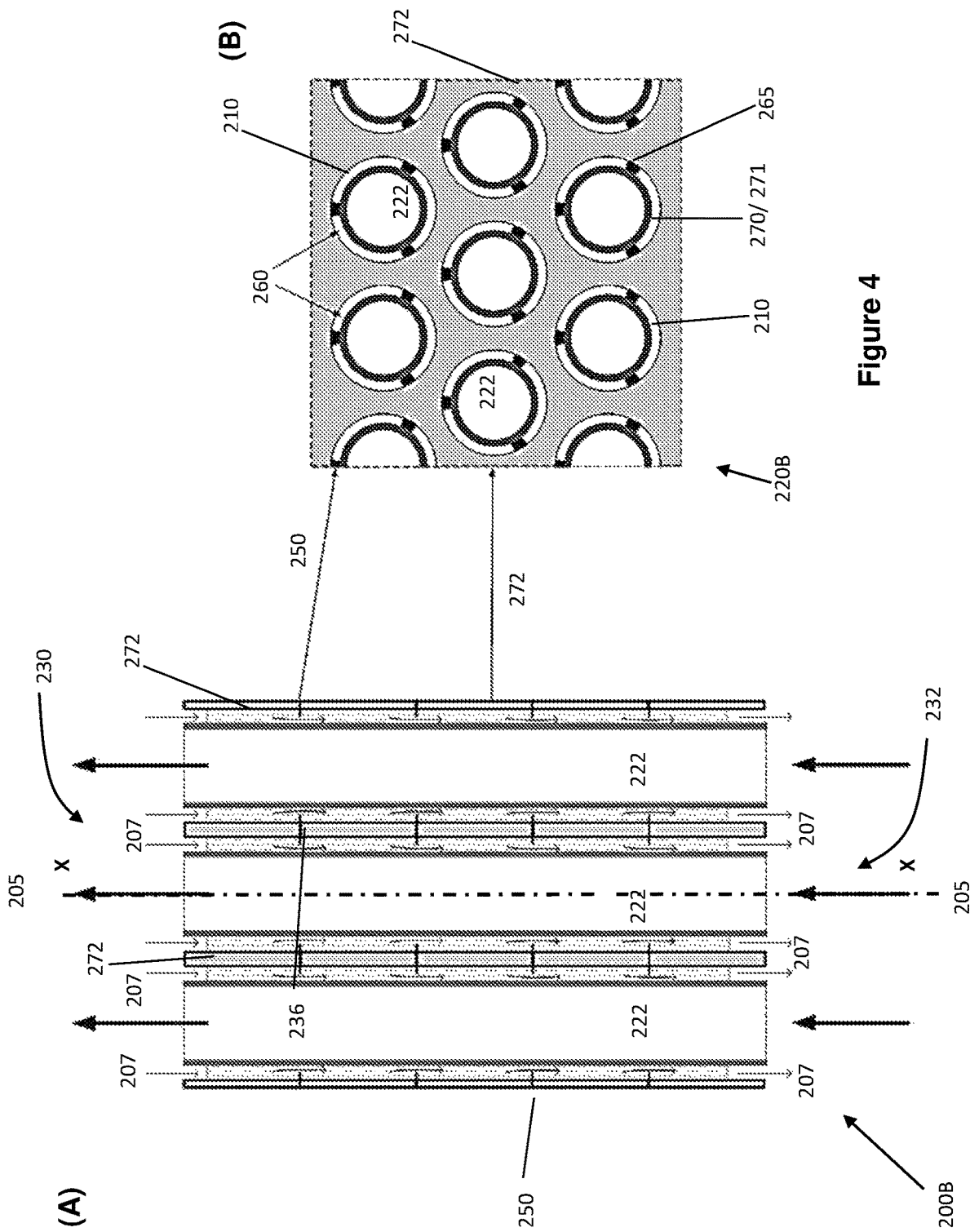
FIG. 4 illustrates a schematic diagram of an annulus-flow tubular particle heat exchanger with stacked ceramic blocks and tube support plates showing (A) A cross-sectional front view; and (B) top view of a ceramic block with a tube support plate.

A third embodiment of the particle heat exchanger 200B according to the present invention is illustrated in FIG. 4. FIG. 4 provides a front cross-sectional view (FIG. 4(A)) and a top cross-sectional view (FIG. 4(B)) of the particle heat exchanger 200B. The heat exchanger 200B has largely the same configuration as described for heat exchanger 200 illustrated in FIG. 2. Like features have there been provided with the same reference numerals as used in relation to heat exchanger 200 illustrated in FIG. 2. In this embodiment, the free space of the housing enclosing the heat transfer tubes 222 has been replaced with a plurality of spaced apart containers 270, each enclosing a heat transfer tube 222 therein. In the illustrated, each spaced apart container 270 is formed from a cylindrical shaft 271 or bore that co-axially encloses each heat transfer tube 222. However, it should be appreciated that this could equally be provided by a plurality of elongate tubes which extend co-axially around each heat transfer tube 222.

As illustrated, each stage is formed from a block 272 having a plurality of spaced apart shafts 271. A heat transfer tube 222 extends through each spaced apart shaft 271. Each shaft 271 having a larger diameter than the outer diameter of the heat transfer tube 222 that extends therethrough, therefore forming an annular gap therebetween. The overall heat exchanger includes two or more two stacked blocks 272, allowing each flow distribution plate 250 being located between adjacent stacked blocks 272.

Each block 272 preferably comprises a high-temperature ceramic blocks with the heat transfer tubes 222 concentrically located inside these the shafts 271 (FIG. 4). This configuration creates annular gap 260 allowing hot particles to flow through and transfer heat to the heat transfer fluid inside the tubes 222 whereas the previous embodiments allows all the space between tubes 222 to be used as particle flow channel.

Each flow distribution plate 250 includes a similar flow constriction opening and tube support arms as previously described to enhance mixing at the end of each stage and to ensure consistent annular gap between the inner wall of the shafts 271 and the outer wall of the heat transfer tubes 222. The annular flow constriction gap 260 between the plate holes and tubes is designed smaller than the gap between the holes of ceramic block and tubes. This ensures that the particle-side heat transfer coefficient can be enhanced with continuous new thermal entrance regions and re-mixing of particles 207.

The particle-side heat transfer coefficient can be improved in each of the above embodiments by using one or more of the following additional features:
- narrower flow constriction openings 260 (annular gap);
- helical inserts inside the annular gap in the shaft of the block 272 (third embodiment only);
- longitudinal fins added (welded) to the tube to increase the particle travel residence time and heat transfer area and also create both axial and rotational particle flow pattern to enhance mixing.

Figure 5:
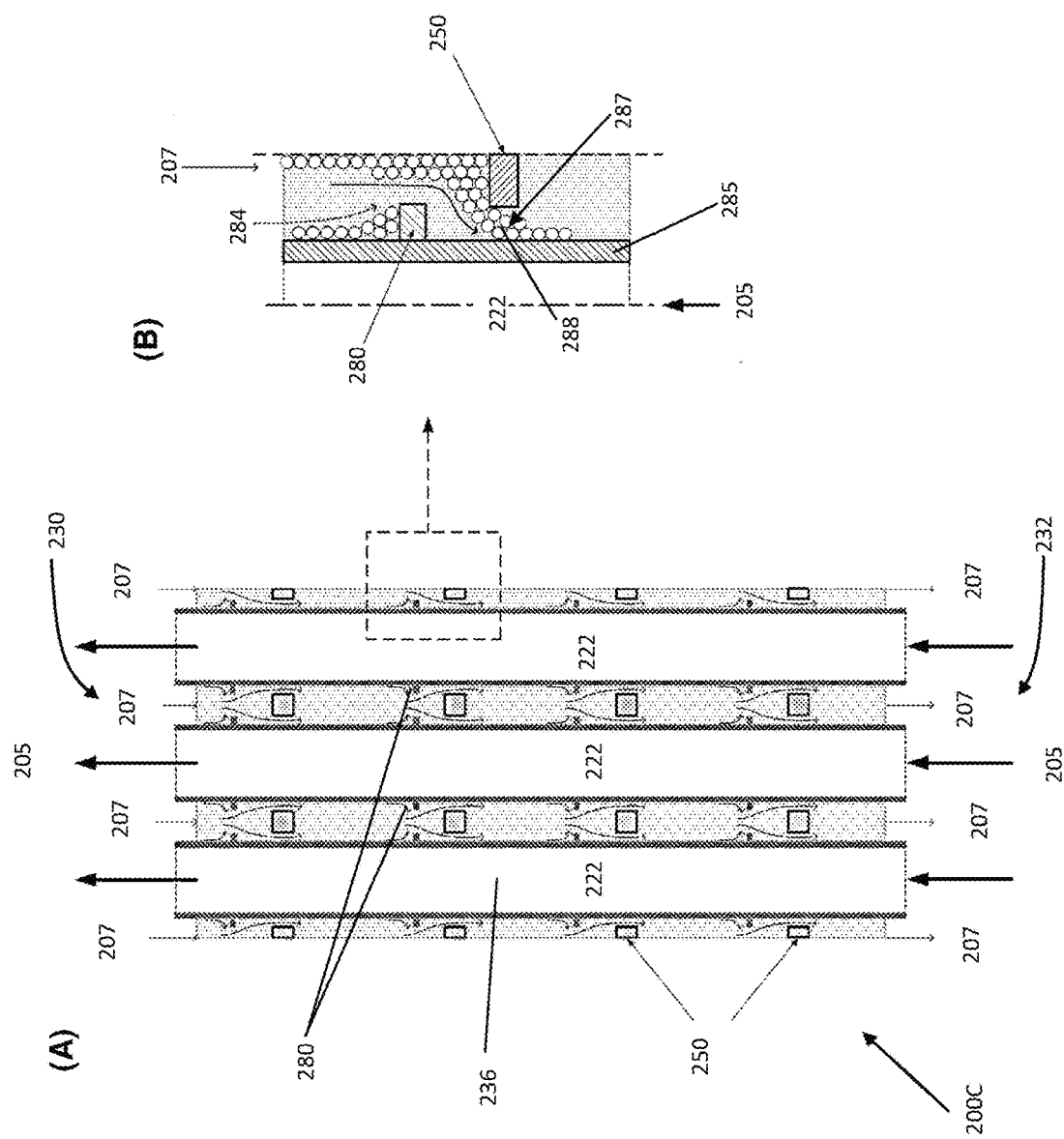
FIG. 5 illustrates a schematic diagram of a multi-stage tubular particle heat exchanger with a vertical tube array configuration and multiple flow distribution plates including additional radial fins showing (A) A cross-sectional front view; and (B) an enlarged cross-sectional view showing the flow interruption function of the radial fin in one particle flow stream.

FIG. 5 illustrates an adaption of the arrangements 200 and 200B shown in FIGS. 2 and 4. The heat exchanger 200C has largely the same configuration as described for heat exchanger 200 illustrated in FIG. 2. Like features have there been provided with the same reference numerals as used in relation to heat exchanger 200 illustrated in FIG. 2. In this heat exchanger 200C, a radial fin/protuberance 280 is included on each heat transfer tube 222 before the flow constriction—i.e. longitudinally spaced apart from a divider, in a position before the flow distribution plate (divider) 250 along the length of the heat transfer 222 relative to the direction of flow of the heat transfer particles 207. This radial fin 280 extends circumferentially around each heat transfer tube 222. The radial fin 280 in this position has been found to enhance the mixing of particles 207 which could create a full renewal of the thermal entrance zone at the subsequent stage below.

As best shown in FIG. 5(B), the radial fin 280 interrupts the development of the thermal boundary layer of particles (near wall particles 284 in FIG. 5(B) near the heat transfer tube wall 285 (cooler than the bulk particles) and then mix with hot particles in the bulk particle stream 207 prior flowing through the annular gap 287 of the flow distribution plate 250. In this case, particles 288 near the heat transfer wall 285 at the start of the subsequent stage below can be fully replaced by hot particles resulting in a full renewal of the thermal entrance zone (full mixing of particles 207). This has been found to further enhance the particle side heat transfer coefficient of this arrangement 200C.

EXAMPLES

The following examples are based on modelling and initial experimental work based on the particle heat exchanger 200 illustrated in FIG. 2. The work initially involved heat transfer modelling and analysis of a moving particle bed in relation to a heat transfer wall (see Examples 1 and 2). This was then experimentally verified using experimental testing rigs (Examples 3 and 4).

Example 1: Heat Transfer Analysis—2D Heat Transfer Model

Figure 6:
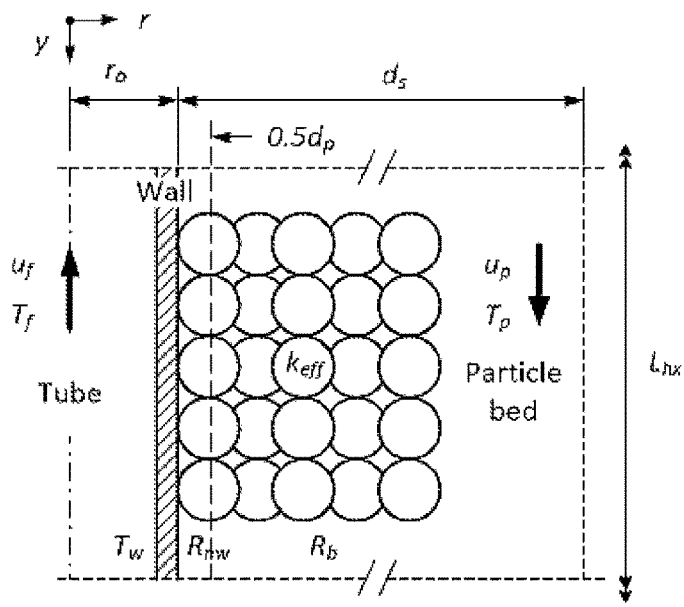
FIG. 6 provides a schematic of the parameters used for the two-dimensional heat transfer modelling.
Figure 7:
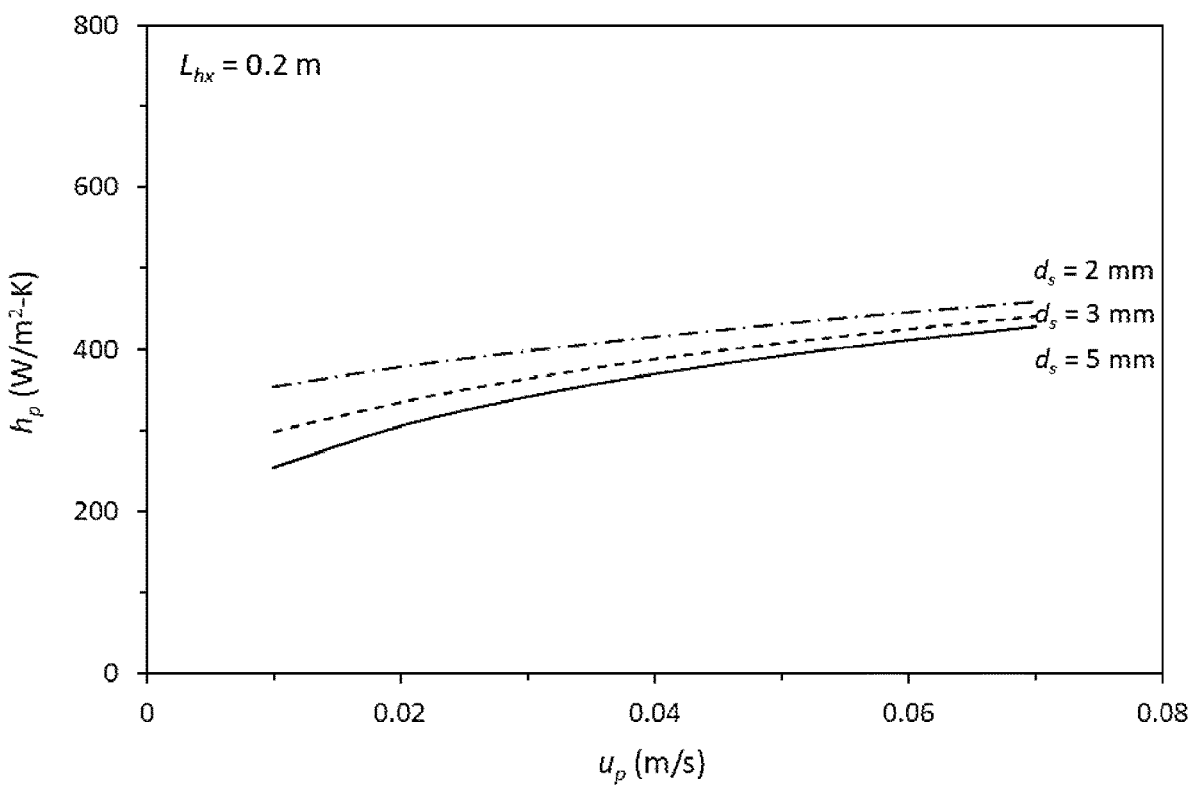
FIGS. 7 to 10 provides the results of the two-dimensional heat transfer modelling in the form of plots of bulk to wall heat transfer coefficient ($h_p$) changes for changes in particle bed velocity ($u_p$) for different particle distances from the wall (heat transfer surface) of the heat transfer tube ($d_s$) and for different heat transfer tube lengths ($L_{hx}$).
Figure 8:
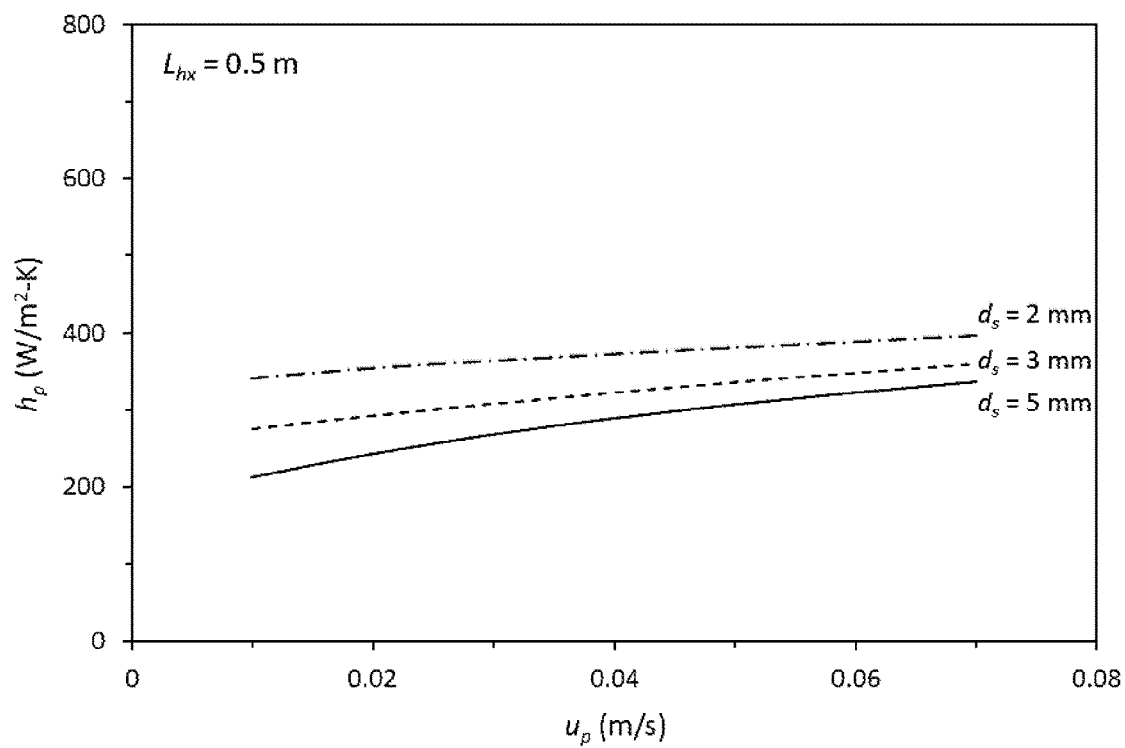
Figure 9:
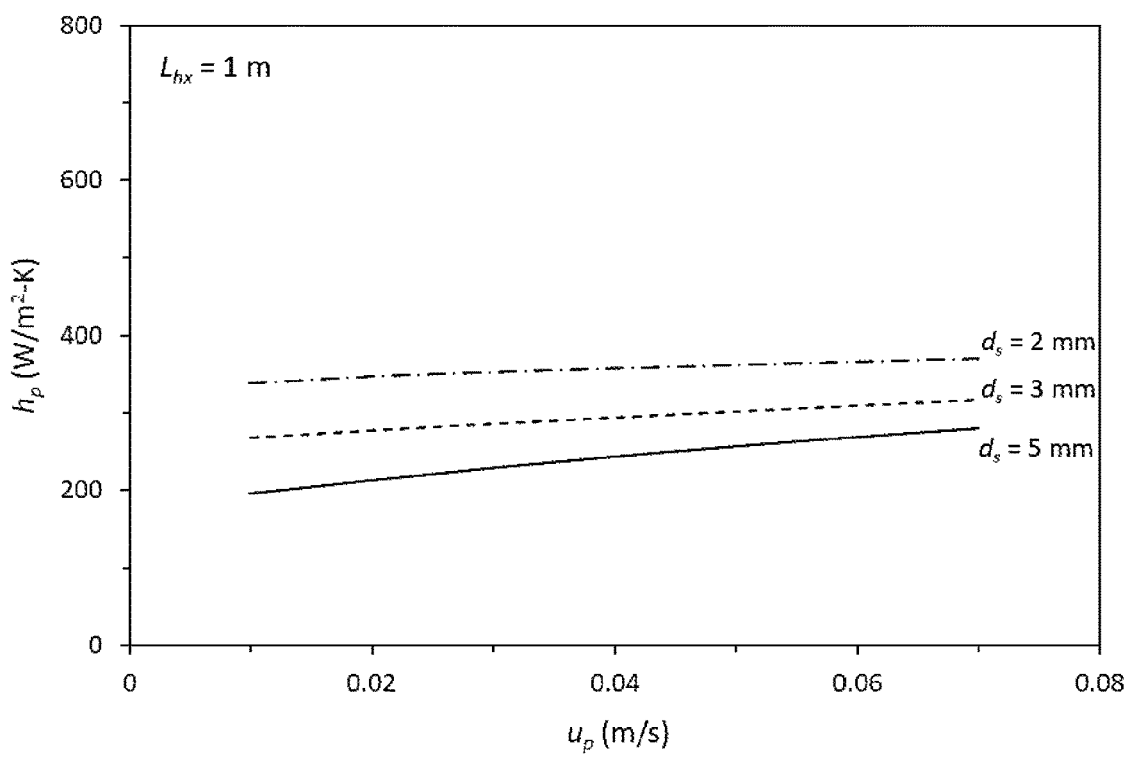

FIG. 6 shows a heat transfer model of a single tube-in-bed PHX which solves a two-dimensional steady-state conservation energy equation. The model was developed to understand particle-side heat transfer and provide a guide for conceptual design. For the condition of axial symmetry with respect to the tube centre axis, the tube-in-bed PHX can be assumed to be a 2D axisymmetric problem instead of a 3D problem. In this model, the particles are assumed to behave as a single continuous medium moving downwardly under gravity along the outer surface of the tube (heat transfer wall). The heat transfer between a moving particle bed and a heat transfer wall takes place by thermal conduction in the radial direction. It can be composed of two thermal resistances: a particle-wall contact resistance ($R_{pw}$) where heat transfer occurs between the first layer of particles (higher porosity region considering spherical particles in contact to the wall) and the heat transfer wall, and a thermal resistance governed by effective thermal conduction inside the bulk flow ($R_b$). In this example, inlet particle and constant wall temperatures are set at 800° C. and 750° C. respectively, while a particle diameter of 350 μm is considered.

Referring to FIG. 6, the model was based on the following energy equation:

$$(\rho c_p)_p u_p \frac{\partial T_P}{\partial y} = \frac{1}{r}\frac{\partial}{\partial r}\left(k_{eff} r \frac{\partial T_P}{\partial r}\right)$$

Where: ρ is the bulk density of particle, $c_p$ is the specific heat capacity of particle, $u_p$ is the particle bed velocity, $T_p$ is the particle temperature, $k_{\mathit{eff}}$ is the effective thermal conductivity of particles, r and y are the radial and axial coordinate respectively. The left hand side of above equation represents the net enthalpy of the particle flow in the control volume whereas the term on the right hand side represents the effective thermal conduction in the radial direction of the control volume.

Bulk to wall heat transfer coefficient ($h_p$):

$$h_p = \frac{1}{1/h_{nw} + 1/h_b}$$

Where $h_{nw}$ is the wall to particle heat transfer coefficient, and $h_b$ is the heat transfer coefficient due to thermal conduction of the bulk flow.

The effective thermal conductivity inside the bulk flow is calculated using the Zehner—Schlunder model (Zehner and Schlunder, 1970). In this example, solid fraction of 0.6 is used for a packed-bed with spherical particles.

The wall to particle heat transfer coefficient is calculated using the method proposed by Botterill and Denloye (1978). In this example, the effect of radiation heat transfer is not considered.

Figure 10:
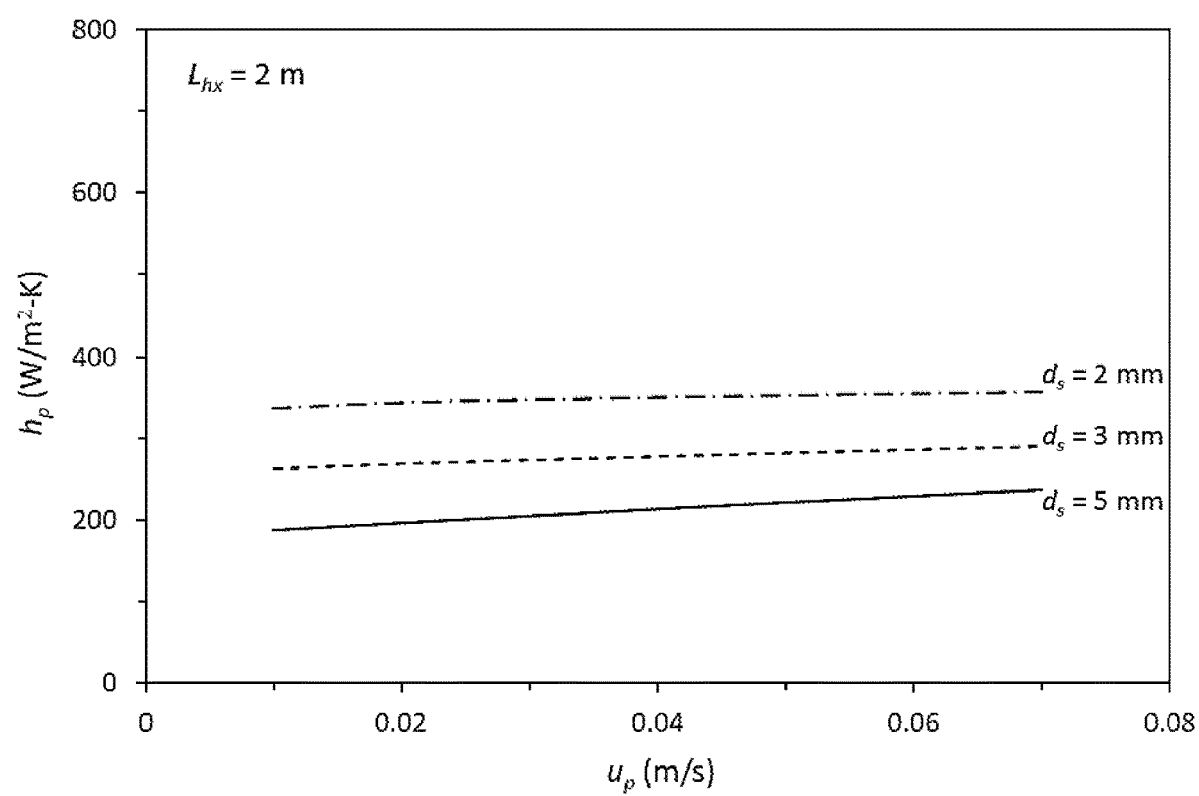

The results of the modelling are shown in FIGS. 7 to 10, which illustrate how the bulk to wall heat transfer coefficient ($h_p$) changes for changes in particle bed velocity ($u_p$) for different particle distances from the wall (heat transfer surface) of the heat transfer tube ($d_s$) and for different heat transfer tube lengths ($L_{hx}$), namely heat transfer tube lengths of 0.2 m (FIG. 7), 0.5 m (FIG. 8), 1.0 m (FIG. 9) and 2.0 m (FIG. 10). Comparing FIGS. 7 to 10, it can be seen at shorter heat transfer tube lengths ($L_{hx}$) of 0.5 m or less, changes in the particle velocity of the particle bed ($u_p$) increases the bulk to wall heat transfer coefficient ($h_p$). However, for heat transfer tube lengths of 1.0 m or more, particle velocity of the particle bed ($u_p$) has a much lower effect in changing the bulk to wall heat transfer coefficient ($h_p$). As explained previously, the particle-side heat transfer coefficient from the heat transfer particle flow to the heat transfer fluid through the wall of the heat transfer tube will approach a constant value even when the velocity of the heat transfer particle flow is increased.

Overall, the results show that increasing particle velocity ($u_p$) will not increase the bulk to wall heat transfer coefficient ($h_p$) for tube length ($L_{hx}$) greater than 1 m as the particle flow becomes thermally developed. Furthermore, decreasing gap ($d_s$) will increase $h_p$ as less number of particles in the channel (less thermal resistance). However, from a practical point of view it may be challenging to maintain consistent gap as narrow as 2 mm.

Example 2: Heat Transfer Analysis—Staged Moving-Bed 2D Heat Transfer Model

Figure 11:
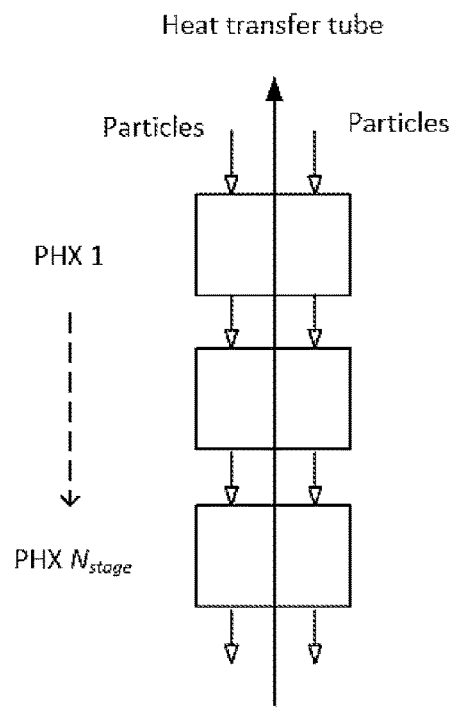
FIG. 11 provides a schematic of the parameters used for the staged moving-bed two-dimensional heat transfer modelling.

FIG. 11 shows a schematic diagram of a staged moving-bed particle heat exchanger connecting in series. In this example, the PHX is divided into a number of stages ($N_{stage}$) and assumed full mixing of particles at the outlet before entering to the next stage. In each stage, the heat transfer between a moving particle bed and a heat transfer wall is calculated using the methodology mentioned in Example 1 by solving a two-dimensional steady-state conservation energy equation.

Figure 12:
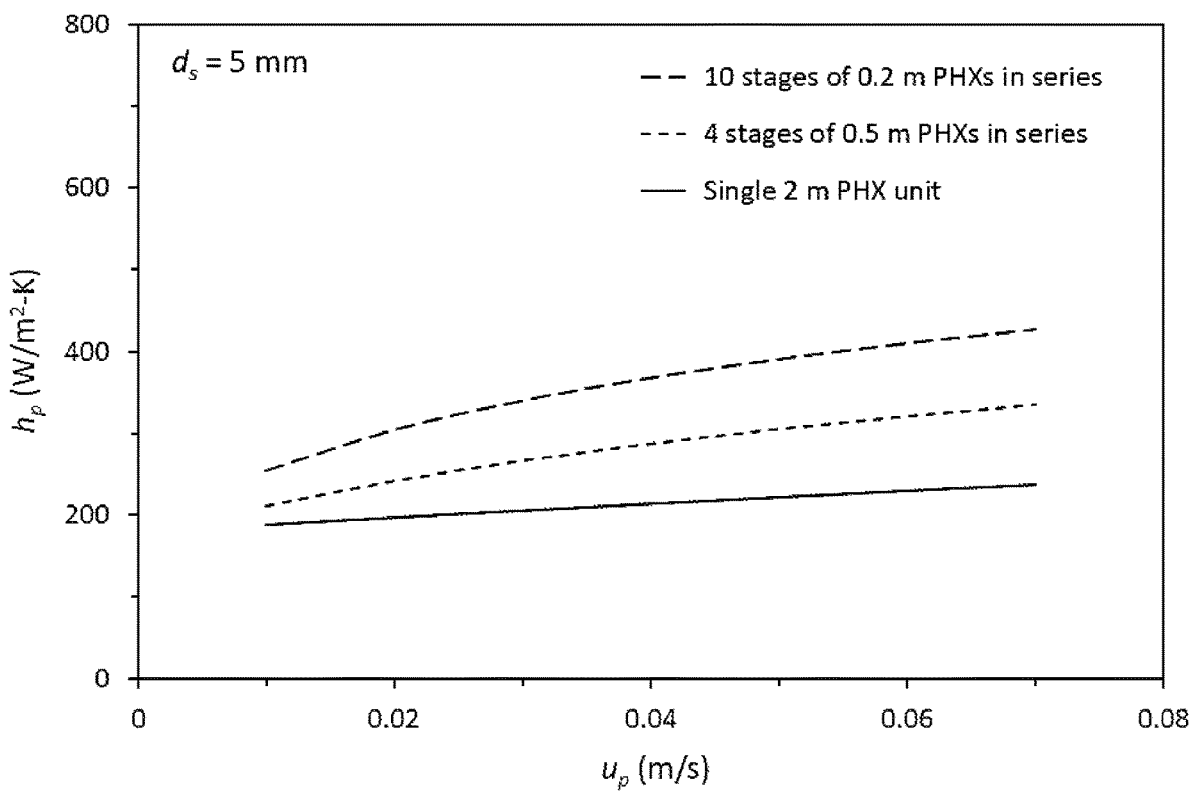
FIG. 12 provides the results of the staged moving-bed two-dimensional heat transfer modelling in the form of plots of bulk to wall heat transfer coefficient ($h_p$) changes for changes in particle bed velocity ($u_p$).

FIG. 12 shows a comparison of bulk-to-wall heat transfer coefficient ($h_p$) as a function of particle velocity ($u_p$) for a single stage PHX, 4 stages PHX and 10 stages PHX. The total heat exchanger length ($L_{hx}$) for all three cases is set to be 2 m. The results reveal that as the particle velocity ($u_p$) increases, a series of shorter PHXs comparing to a single stage PHX enables enhancement of the particle-side heat transfer coefficient through re-mixing of particles at the outlet before entering to the next stage and also allowing to continuously create new thermal entrance regions.

Example 3: Experimental Works—Cold Flow Test Rig (Embodiment 1)

Figure 13A:
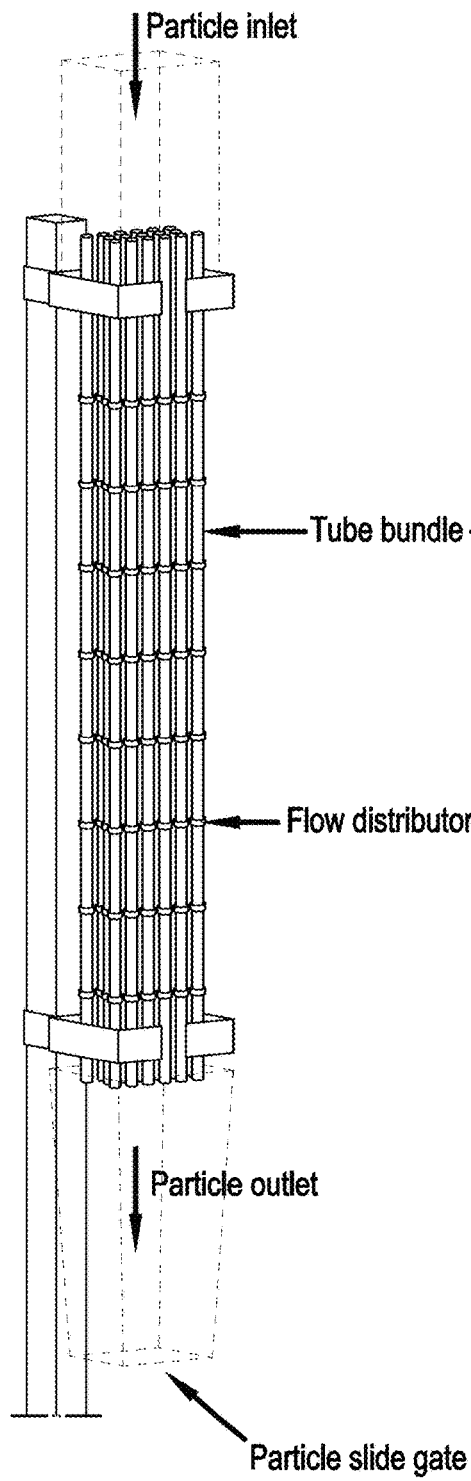
FIG. 13A provides a schematic of the cold flow experimental rig used to validate particle flow through a staged particle heat exchanger according to embodiments of the present invention.
Figure 13A:
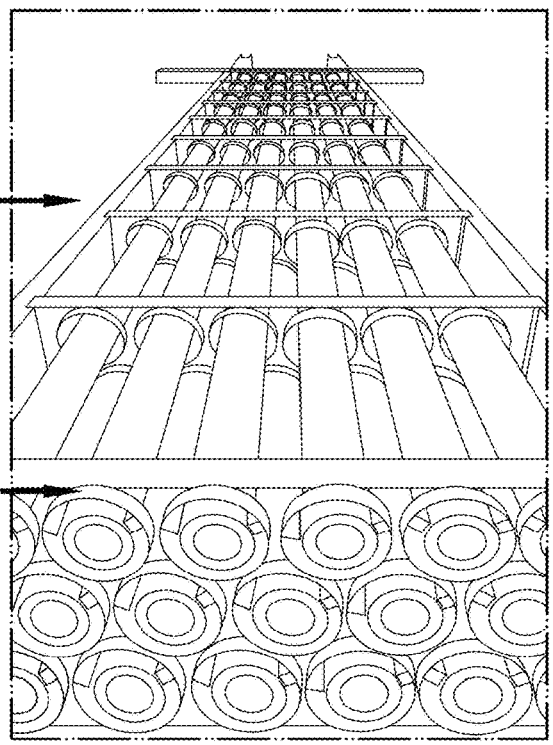

Experimental works were undertaken to investigate particles flow behaviour in a heat exchanger configuration shown in accordance with FIG. 2. As illustrated in FIG. 13, an experimental rig was constructed to study particle movement through the heat exchanger in room temperature conditions (i.e. not using heated particles). For the flow visualisation, the housing and dividers of the test rig were made from clear polycarbonate, which configured to enclose particles flow and a bundle of metal tubes.

The experimental rig was tested with particles (300 µm ceramic proppants comprising 75% $Al_2O_3$, 11% $SiO_2$, 9% $Fe_2O_3$, and 3% TiO) packed in the housing and an upper bin. Particles are released from the heat exchanger by opening the slide gate at the bottom of the test rig.

Figure 13B:
FIG. 13B provides a series of photographs illustrated the flow progress from one test run of the cold flow experimental rig shown in FIG. 13A.

The results of one run are illustrated in FIGS. 13B (A) to (D) which show the progress of the top of the particle flow through the cold flow experimental rig from full (FIG. 13B(A), to ⅔ flow completion (FIG. 13B(D). The experimental trials showed that there were no particles blockage when flowing through the annular gap of the flow distribution plate and no significant particle stagnation zone. Additionally, the experimental trials showed that the presence of flow constriction zones using divider plates did cause the particulate flow to remix at every flow stage when flowing towards and through each flow constriction. Each stage did act as a short particle bed, which gravity fed into the subsequent stage below.

Example 4: Hot Particle Testing Rig

Figure 14:
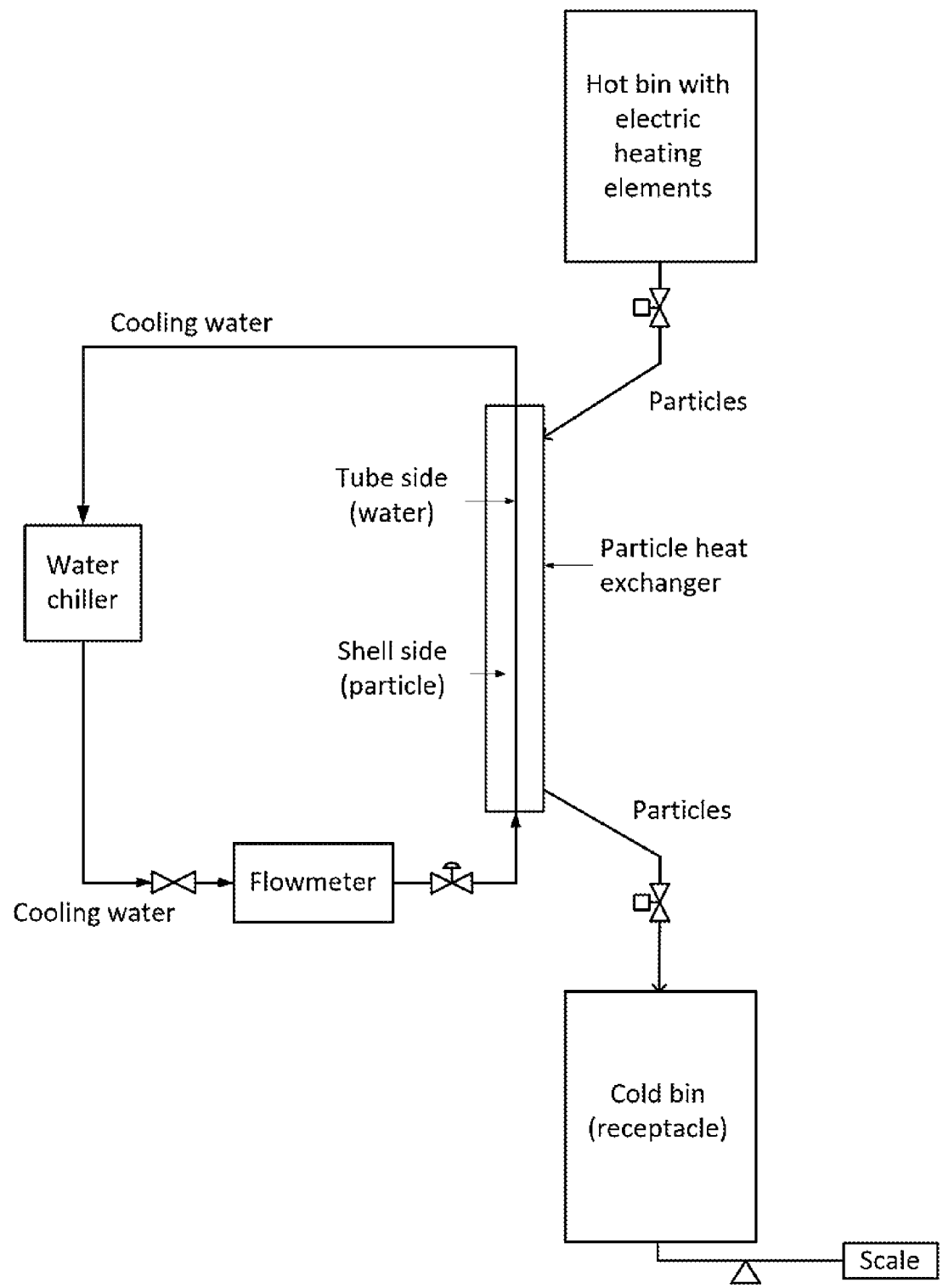
FIG. 14 provides a schematic of the hot flow experimental rig which will be used to validate particle flow and heat transfer characteristics of a staged particle heat exchanger according to embodiments of the present invention.

A hot particle test rig was constructed in accordance with the heat exchanger configuration shown in FIG. 2. As illustrated in FIG. 14, this rig consisted of a hot bin incorporating electric heating elements, a single shell and tube particle heat exchanger, a particle flow control valve and a cold bin (receptacle). Dense particles will firstly be heated to the desired temperature in the hot bin and the hot particles will be released to the shell-side of the heat exchanger by opening the particle flow control valve. Heat will be extracted from the hot particles to the cooling water in the tube and then particles will be released to the receptacle. Temperatures and mass flow rates will be measured throughout the experiments.

The experimental rig was tested with particles (350 µm ceramic proppants comprising 75% $Al_2O_3$, 11% $SiO_2$, 9% $Fe_2O_3$, and 3% TiO).

The particle bulk to wall heat transfer coefficient ($h_p$) values were calculated using the following equation based on measured mass flow rates and temperatures on both particle and water sides of the particle heat exchanger:

$$h_p = \cfrac{1}{\cfrac{1}{U_{hx}} - \cfrac{A_o \ln(d_o/d_i)}{2\pi k_{tube} L_{hx}} + \cfrac{A_o}{h_f A_i}}$$

Where the overall heat transfer coefficient ($U_{hx}$) was calculated using the logarithmic mean temperature difference method for a counter-flow heat exchanger and the water-side convective heat transfer coefficient ($h_f$) was calculated using the Gnielinski's equation.

The hot particle test rig will be used to investigate the particle bulk to wall heat transfer coefficient ($h_p$) using the hot particle test rig. Experimental results will be used to validate the models developed in Examples 1 to 2 and confirm the particle side heat transfer enhancement for the staged particle heat exchanger design.

Figure 15:
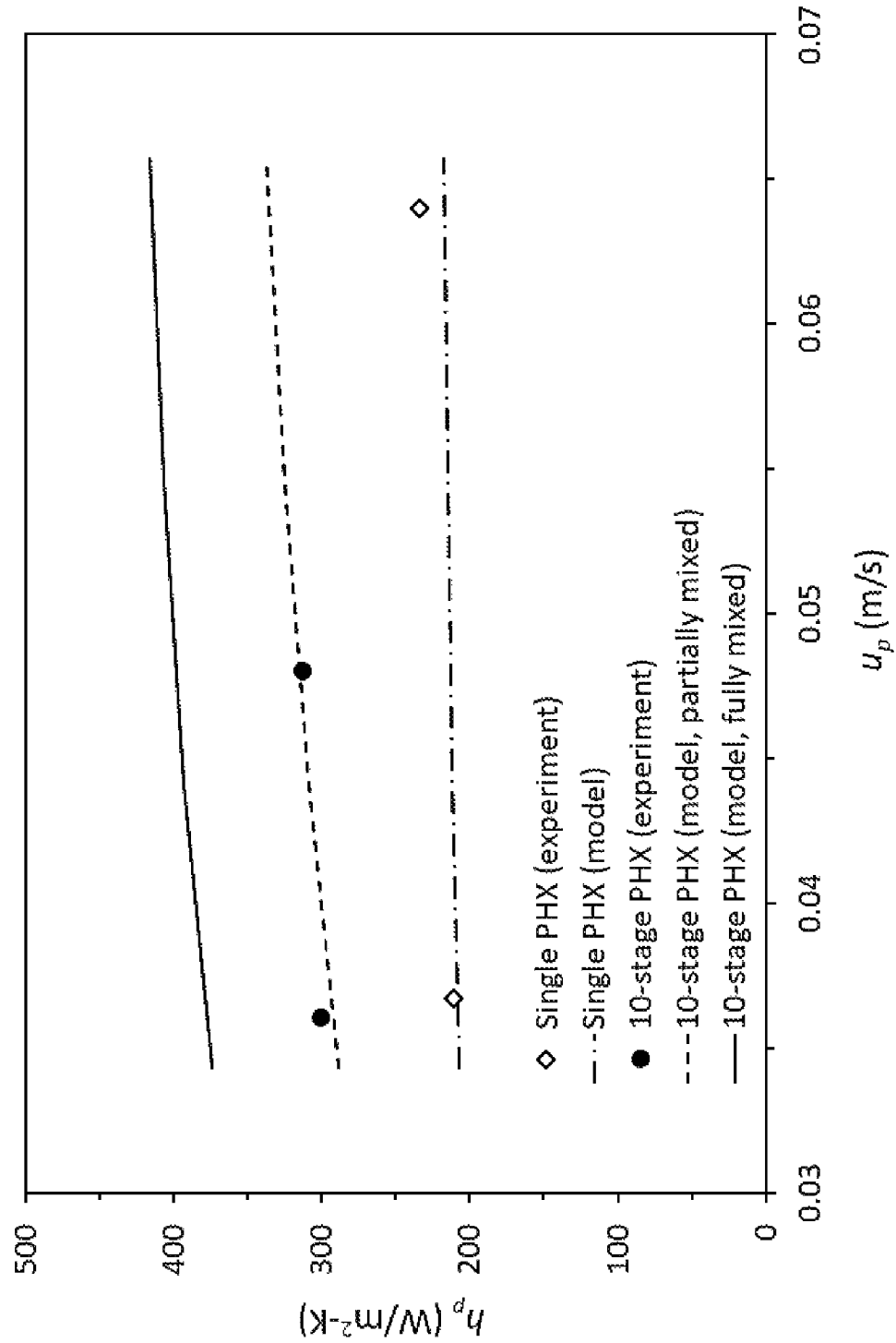
FIG. 15 provides the results of the experiments and heat transfer modelling in the form of plots of bulk to wall heat transfer coefficient ($h_p$) as a function of particle bed velocity ($u_p$) for a single and a staged particle heat exchanger.

FIG. 15 shows a comparison of measured and simulated particle heat transfer coefficient ($h_p$) values over the particle velocity ($u_p$) range of interest for a single stage PHX and 10 stages PHX. The total heat exchanger length ($L_{hx}$) for both cases is 1 m. It can be seen that $h_p$ values obtained from the heat transfer models as developed in Examples 1 and 2 agree well with measurements for both PHXs. In the case of 10 stages PHX, the heat transfer model assumes partial mixing of the particles near the constriction gap for each stage. The experimental results also confirm the particle side heat transfer enhancement for the heat exchanger design 200 as illustrated in FIG. 2 as compared to the heat exchanger design without multiple staging. Based on the heat transfer model that assumes full mixing of the particles near the constriction gap for each stage, results shown in FIG. 15 reveals that the particle side heat transfer could be further enhanced due to full renewal of thermal entrance effects (i.e. full mixing of particles) for each stage.

Those skilled in the art will appreciate that the invention described herein is susceptible to variations and modifications other than those specifically described. It is understood that the invention includes all such variations and modifications which fall within the spirit and scope of the present invention.

Where the terms "comprise", "comprises", "comprised" or "comprising" are used in this specification (including the claims) they are to be interpreted as specifying the presence of the stated features, integers, steps or components, but not precluding the presence of one or more other feature, integer, step, component or group thereof.

The invention claimed is:

1. A particle heat exchanger comprising:
    a housing including:
        an inlet located at the top of the housing, and
        an outlet located below the inlet,
        the housing configured to enclose a flow of heat transfer particles which flows downwardly from the inlet to the outlet within the housing;
    at least one heat transfer tube including a heat transfer medium, each heat transfer tube being enclosed in the housing and in contact with the flow of heat transfer particles therein, each heat transfer tube extending substantially parallel to an axis extending between the inlet and outlet of the housing; and
    at least one divider located between the inlet and outlet of the housing, the at least one heat transfer tube extending through each divider, each divider including at least one opening configured to form at least one flow constriction in the flow of heat transfer particles between the inlet and outlet of the housing.

2. The particle heat exchanger according to claim 1, wherein the housing is configured to direct the flow of heat transfer particles perpendicularly downwardly from inlet towards the outlet relative to flow between the inlet and outlet of the housing.

3. The particle heat exchanger according to claim 1, wherein the axis between the inlet and outlet defines a vertical axis, and each of the heat transfer tubes are vertically orientated within the housing.

4. The particle heat exchanger according to claim 1, wherein the at least one opening of the divider constricts the flow by at least 20% of the cross-sectional flow area within the housing, preferably between 20% to 80% of the cross-sectional flow area within the housing.

5. The particle heat exchanger according to claim 1, wherein the opening comprises an aperture located proximate to, preferably surrounding the intersection between each of the heat transfer tubes and each divider.

6. The particle heat exchanger according to claim 1, wherein the opening comprises an annular opening, preferably an annulus surrounding the intersection between each of the heat transfer tubes and each divider.

7. The particle heat exchanger according to claim 1, wherein each opening includes at least one arm extending from the divider to the heat transfer tube configured to locate the heat transfer tube within each opening.

8. The particle heat exchanger according to claim 1, wherein the at least one heat transfer medium comprises a heat transfer fluid that flows through each heat transfer tube, and wherein that flow of heat transfer fluid is preferably at least one of in a counter-current direction or co-current direction to the flow of heat transfer particles.

9. The particle heat exchanger according to claim 1, comprising at least two heat transfer tubes, preferably multiple heat transfer tubes, laterally spaced apart within the housing.

10. The particle heat exchanger according to claim 1, wherein the heat transfer tubes are arranged in a vertical tube array within the housing.

11. The particle heat exchanger according to claim 1, wherein each heat transfer tube comprises a substantially linear cylindrical pipe.

12. The particle heat exchanger according to claim 1, wherein each heat transfer tube is constructed of a thermally conductive material selected from metals, ceramics, carbides, such as stainless steel, nickel-based alloy, alumina, silicon carbide and graphite.

13. The particle heat exchanger according to claim 1, wherein the particle heat exchanger includes at least two dividers spaced apart between the inlet and outlet of the housing along the length of each heat transfer tube.

14. The particle heat exchanger according to claim 1, wherein the at least one divider comprises a planar element which is radially orientated to the axis extending between the inlet and outlet so as to divide the housing into at least two separated particle flow chambers, wherein the divider preferably comprises a sheet or plate.

15. The particle heat exchanger according to claim 1, wherein the housing comprises:
    a container having an interior space which encloses all of the heat transfer tubes within the interior space therein;
    a plurality of spaced apart flow conduits, each having an inlet and outlet and each containing a heat transfer tube that extends therein; or
    a plurality of spaced apart containers, each enclosing a heat transfer tube therein.

16. The particle heat exchanger according to claim 15, wherein the housing includes a mounting body having a plurality of spaced apart shafts, a heat transfer tube extends through each spaced apart shaft, each shaft having a larger diameter than the outer diameter of the heat transfer tube that extends therethrough.

17. The particle heat exchanger according to claim 1, further including at least one fluidising gas arrangement located at or proximate the constriction configured to create a localised fluidising particle bubble proximate the constriction.

18. The particle heat exchanger according to claim 1, further including at least one helical insert extending around at least one heat transfer tube, and/or at least one radial element, preferably a rib or fin, extending radially from the surface of at least one heat transfer tube into the housing.

19. The particle heat exchanger according to claim 1, wherein the heat transfer particles comprise solid particles, preferably solid particulates having a mean particle size of between 100 and 800 μm, preferably between 200 and 500 μm, and more preferably around 300 μm.

20. The particle heat exchanger according to claim 1, comprising a heat exchanger in a solar power/thermal system, preferably a heat exchanger in thermal communication with the solar receiver of a solar power/thermal system.

* * * * *